(12) United States Patent
Lin

(10) Patent No.: US 11,033,989 B2
(45) Date of Patent: Jun. 15, 2021

(54) JIG STRUCTURE FOR MANUFACTURING HEAT DISSIPATION UNIT

(71) Applicant: ASIA VITAL COMPONENTS CO., LTD., New Taipei (TW)

(72) Inventor: Chih-Yeh Lin, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 239 days.

(21) Appl. No.: 16/041,829

(22) Filed: Jul. 22, 2018

(65) Prior Publication Data
US 2020/0023475 A1 Jan. 23, 2020

(51) Int. Cl.
| | |
|---|---|
| *B23K 37/04* | (2006.01) |
| *B23K 15/06* | (2006.01) |
| *B23K 15/00* | (2006.01) |
| *B21D 53/08* | (2006.01) |
| *B23K 26/035* | (2014.01) |
| *F28F 3/02* | (2006.01) |
| *B23K 26/12* | (2014.01) |

(52) U.S. Cl.
CPC ........ *B23K 37/0443* (2013.01); *B21D 53/085* (2013.01); *B23K 26/035* (2015.10); *F28F 3/02* (2013.01); *B23K 15/00* (2013.01); *B23K 15/06* (2013.01); *B23K 26/125* (2013.01)

(58) Field of Classification Search
CPC .................................. H01J 37/16; B01J 3/006
See application file for complete search history.

(56) References Cited

U.S. PATENT DOCUMENTS

| | | | |
|---|---|---|---|
| 7,695,774 B2* | 4/2010 | Ohtsu ................... | A01N 59/16 |
| | | | 427/553 |
| 2009/0200278 A1 | 8/2009 | Amesbury et al. | |
| 2017/0120332 A1* | 5/2017 | DeMuth ................. | B22F 10/30 |
| 2018/0246089 A1* | 8/2018 | Chou ................. | G01N 33/5094 |

FOREIGN PATENT DOCUMENTS

| | | |
|---|---|---|
| CN | 201082499 Y | 7/2008 |
| CN | 106141452 A | 11/2016 |
| CN | 108213708 A | 6/2018 |
| TW | 200740492 A | 11/2007 |
| TW | 200808480 A | 2/2008 |

\* cited by examiner

*Primary Examiner* — Tyrone V Hall, Jr.
*Assistant Examiner* — Abbie E Quann
(74) *Attorney, Agent, or Firm* — Thomas J. Nikolai; DeWitt LLP

(57) ABSTRACT

A jig structure for manufacturing heat dissipation unit includes a main body, which internally defines a chamber and has a top forming an upper side thereof. The top defines at least one opening, on which at least one silicon dioxide layer is provided. The chamber is in a vacuum-tight state or maintains a positive pressure inert gas atmosphere therein. The jig structure for manufacturing heat dissipation unit can be used with a laser machining tool to provide a better environment and increased flexibility for laser machining or laser welding in manufacturing a heat dissipation unit.

6 Claims, 3 Drawing Sheets

JIG STRUCTURE FOR MANUFACTURING HEAT DISSIPATION UNIT

FIELD OF THE INVENTION

The present invention relates to a jig structure for manufacturing heat dissipation unit, and more particularly, to a jig structure for manufacturing heat dissipation unit that protects a workpiece against contamination and prevents the occurrence of oxidation reaction during laser welding or laser machining.

BACKGROUND OF THE INVENTION

The currently available vapor chamber is a heat dissipation unit usually formed of two metal plate members that are closed to each other and then joined together by diffusion bonding or welding, so that an airtight chamber is formed between the two metal plate members. Further, a wick structure and a working fluid is provided in the airtight chamber, so that enhanced thermal conduction can be achieved by the vapor chamber based on the principle of vapor-liquid circulation therein.

Generally, the two metal plate members for forming the vapor chamber are of the same metal material, which can be copper, aluminum, stainless steel, titanium or magnesium. In the case two metal plate members of different materials are used to form the vapor chamber, they could not be joined together using general welding or diffusion bonding. A person having ordinary skill in the art would join the two metal plate members of different materials together by laser welding. When performing laser welding, an environment supplied with an inert gas or a vacuum environment is required to avoid contamination of the metal plate members being welded or the occurrence of oxidation reaction during the laser welding. Therefore, the laser welding operation is conducted on a laser welding tool machine, on which a sealed chamber is provided. The sealed chamber provides a vacuum environment or is supplied with an inert gas, which can advantageously solve the problem of contaminated workpiece or the occurrence of oxidation reaction. However, in the case of having a workpiece dimensionally larger than the sealed chamber, it is impossible to process the workpiece in the sealed chamber on the laser welding tool machine. In other words, while the prior art laser welding tool machine provided with a sealed chamber has improved a part of the disadvantages in the conventional laser welding processing technique, it does not overcome the problem of an oversized workpiece.

SUMMARY OF THE INVENTION

A primary object of the present invention is to solve the problem in the prior art by providing a jig structure for use in laser welding to manufacture a heat dissipation unit.

To achieve the above and other objects, the jig structure for manufacturing heat dissipation unit according to the present invention includes a main body.

The main body internally defines a chamber and has a top forming an upper side thereof. The top defines at least one opening, on which at least one silicon dioxide layer is provided. The chamber is in a vacuum-tight state or maintains a positive pressure inert gas atmosphere therein.

The jig structure of the present invention provides an airtight laser welding environment for a workpiece, i.e. a heat dissipation unit in the present invention, which requires processing by laser welding. The jig structure can be in a vacuum-tight state or maintains a positive pressure inert gas atmosphere therein, so as to protect the workpiece against contamination and prevents the occurrence of oxidation reaction during the laser welding.

Further, differently sized jig structures can be provided and a suitable one can be selected for use according to the size of the workpiece. In this manner, the laser welding or laser machining can be performed with increased flexibility.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
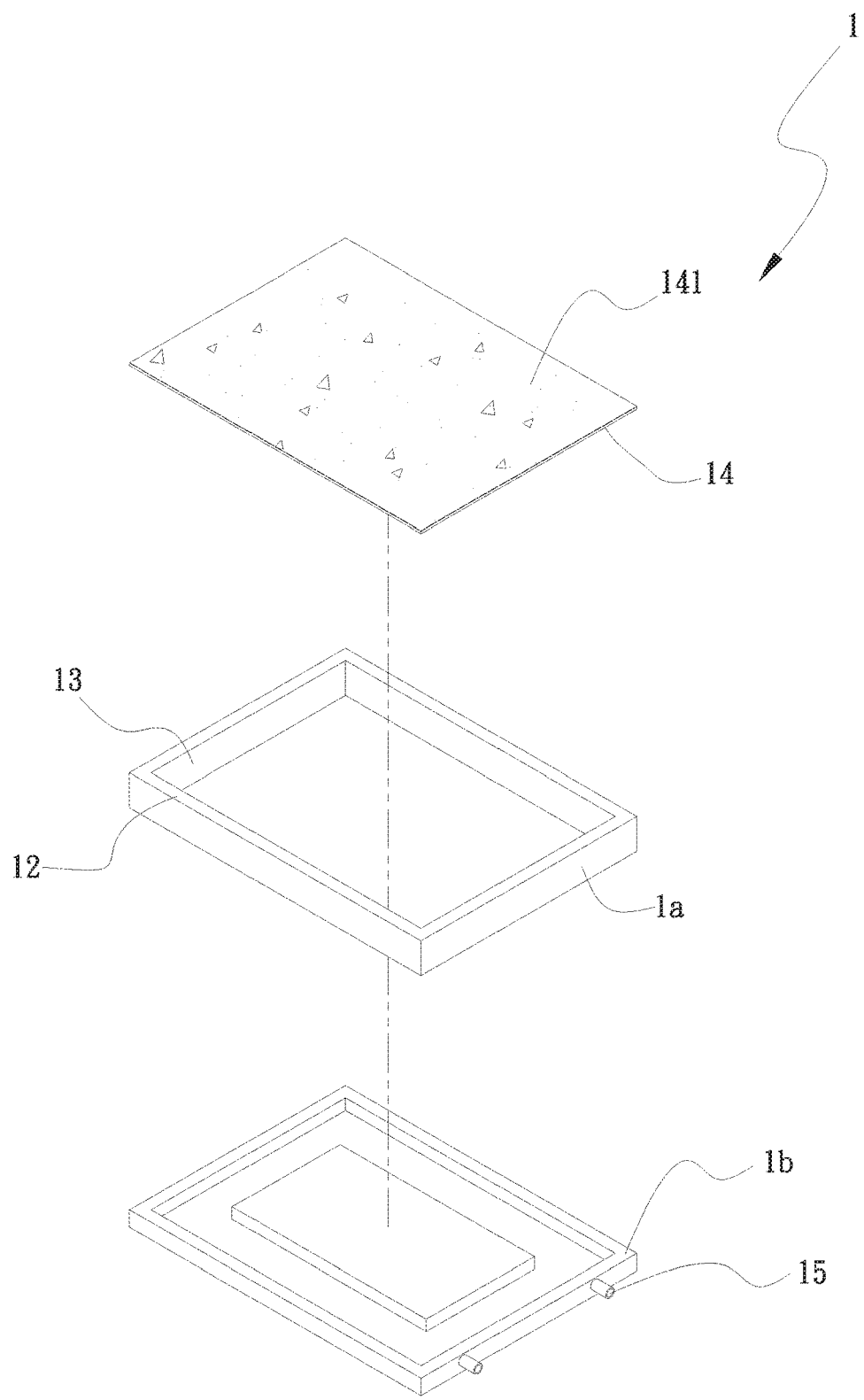
FIG. 1 is an exploded perspective view of a jig structure for manufacturing heat dissipation unit according to a preferred embodiment of the present invention.
Figure 2:
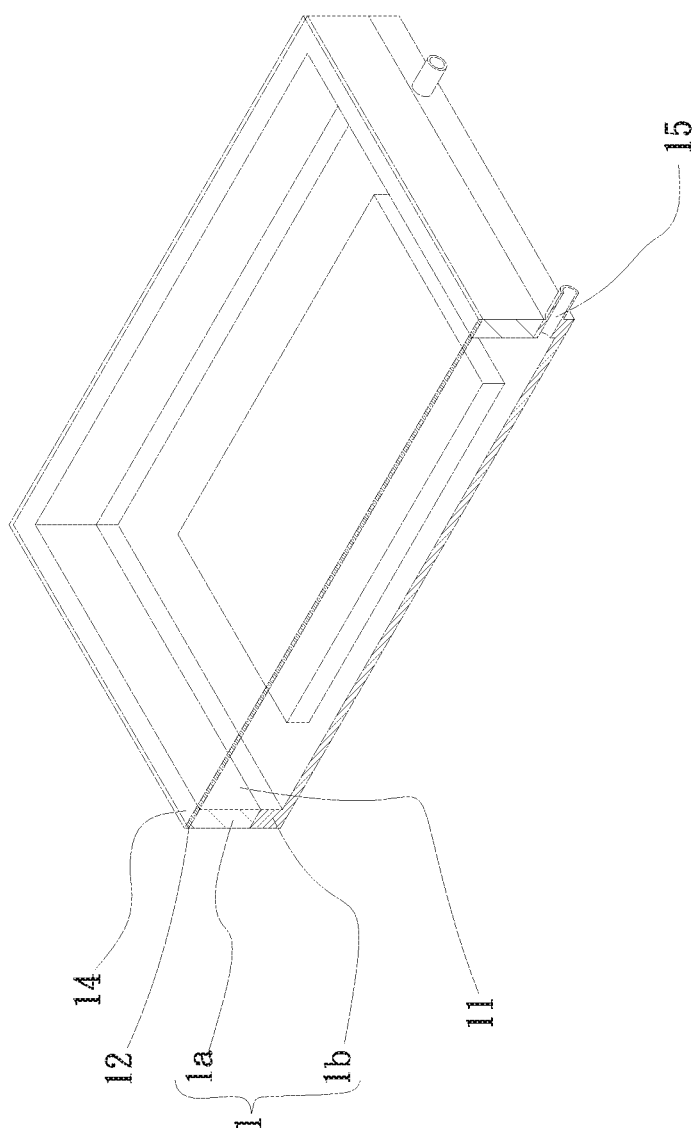
FIG. 2 is an cutaway view of the jig structure of FIG. 1.

Please refer to FIGS. 1 and 2, which are exploded perspective view and cutaway view, respectively, of a jig structure for manufacturing heat dissipation unit according to a preferred embodiment of the present invention. As shown, the jig structure according to the preferred embodiment of the present invention includes a main body 1.

The main body 1 internally defines a chamber 11 and has a top 12 forming an upper side thereof. The top 12 defines at least one opening 13, on which at least one silicon dioxide layer 14 is provided. The chamber 11 is in a vacuum-tight state; and the main body 1 can be made of an aluminum material or a stainless steel material.

The main body 1 is formed of a first part 1a and a second part 1b, which are correspondingly assembled together to define the chamber 11 in between them. The top 12 is located on one side of the first part 1a. The main body 1 is provided with at least one passage 15 communicable with the chamber 11, so that the chamber 11 can be vacuumized or an inert gas can be supplied into the chamber 11 via the passage 15.

According to the present invention, the silicon dioxide layer 14 is quartz and has average 92% transmittance of light within the range of 260 nm and 1100 nm. An anti-reflection film 141 can be further provided on each of two opposite surfaces of the silicon dioxide layer 14; and the silicon dioxide layer 14 with the anti-reflection films 141 can have 98% to 100% transmittance of light within the range of 400 nm and 1100 nm to thereby increase its transmittance of laser.

Figure 3:
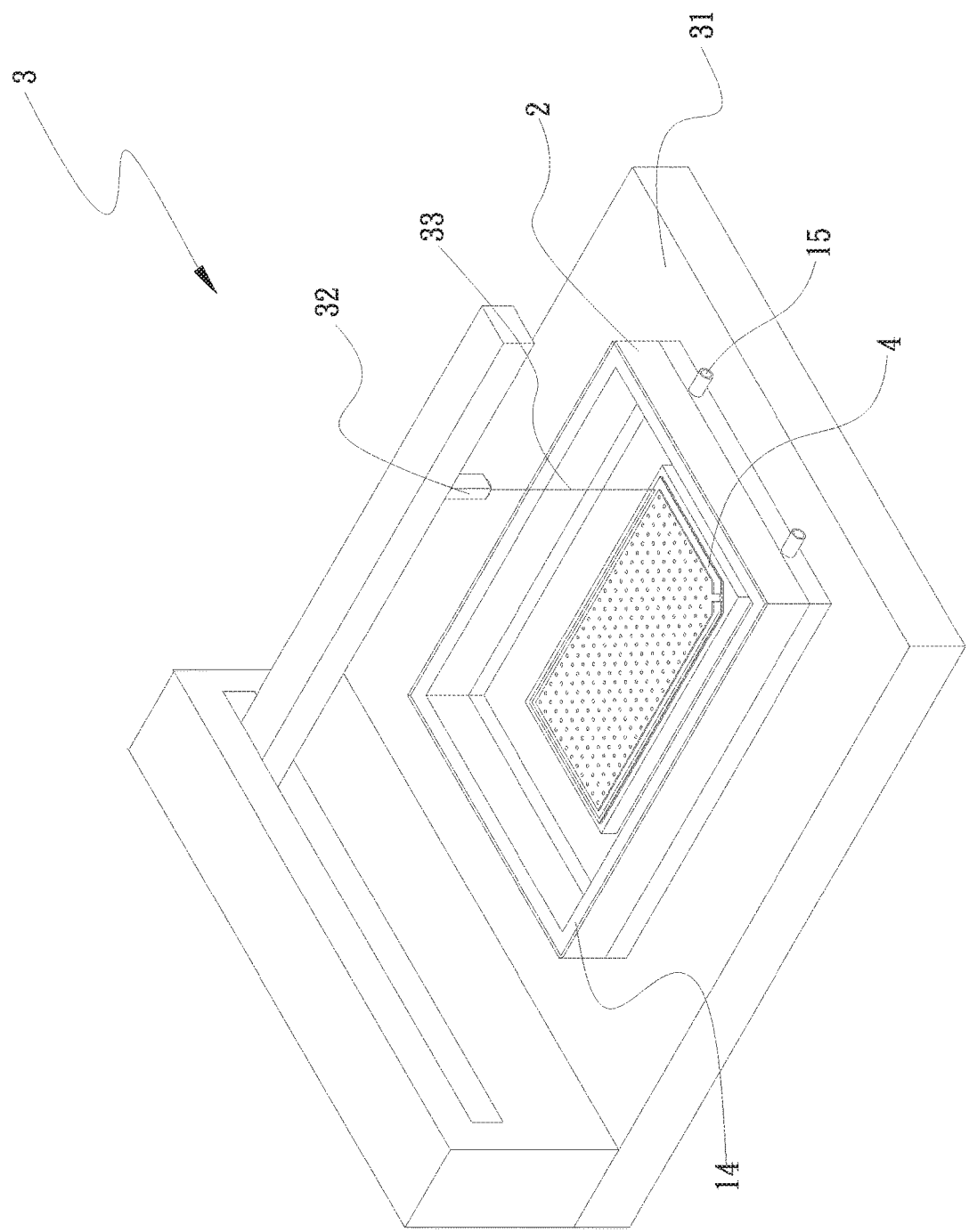
FIG. 3 shows the jig structure for manufacturing heat dissipation unit according to the present invention is positioned on a worktable of a laser machining tool for use.

Please refer to FIG. 3, which shows the use of the jig structure for manufacturing heat dissipation unit according to the present invention. Herein, the jig structure for manufacturing heat dissipation unit is also briefly referred to as the jig structure and generally denoted by reference numeral 2. As can be seen in FIG. 3, when a laser welding process is to be performed on a workpiece 4, which is a heat dissipation unit according to the present invention, first position the jig structure 2 on a worktable 31 of a laser machining tool 3, and then position the workpiece 4 in the jig structure 2. The jig structure 2 for manufacturing heat dissipation unit is then tightly closed, and the chamber 11 of the jig structure 2 can be vacuumized or an inert gas, such as argon, is supplied into the chamber 11 of the jig structure 2 via the at least one passage 15, in order to protect the workpiece 4 against contamination and prevent the occurrence of oxidation reaction. Thereafter, start laser welding or laser machining on the workpiece 4 using a laser head 32 located above the jig structure 2. A laser beam 33 exits from the laser head 32 to penetrate the silicon dioxide layer 14 on the top 12 of the main body 1 into the jig structure 2 to conduct laser machining or laser welding on the workpiece 4. Since the silicon dioxide layer 14 used in the present invention is quartz that has at least 92% transmittance of laser beam 33, the laser machining and laser welding performed can have relatively lowered power loss, while a vacuum-tight or an inert-gas-protected working environment can be maintained.

In summary, the jig structure for manufacturing heat dissipation unit according to the present invention enables increased flexibility in performing laser machining or laser welding and can be advantageously provided in different sizes according to the size of the workpiece, i.e. the heat dissipation unit to be manufactured, which in turn enables lowered manufacturing cost.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A jig structure for use in manufacturing heat dissipation units, comprising:
   a main body internally defining a chamber and having a top forming an upper side thereof; the top defining at least one opening, on which at least one silicon dioxide layer is provided; and the chamber being capable of maintaining a vacuum therein, wherein the silicon dioxide layer has average 92% transmittance of light within the range of 260 nm and 1100 nm.

2. The jig structure for manufacturing heat dissipation units as claimed in claim 1, wherein the silicon dioxide layer is quartz.

3. The jig structure for manufacturing heat dissipation units as claimed in claim 1, wherein the main body is made of a material selected from the group consisting of an aluminum material and a stainless steel material.

4. The jig structure for manufacturing heat dissipation units as claimed in claim 1, wherein the main body is provided with at least one passage communicable with the chamber; such that the chamber can be vacuumized or alternatively an inert gas can be introduced into the chamber via the passage.

5. The jig structure for manufacturing heat dissipation units as claimed in claim 1, wherein the main body is formed of a first part and a second part, which are correspondingly assembled together to define the chamber; and the top being located on one side of the first part.

6. The jig structure for manufacturing heat dissipation units as claimed in claim 1, wherein the silicon dioxide layer is provided at each of two opposite surfaces thereof with an anti-reflection film; and the silicon dioxide with the anti-reflection films having 98% to 100% transmittance of light within the range of 400 nm and 1100 nm.

* * * * *